Patented May 14, 1929.

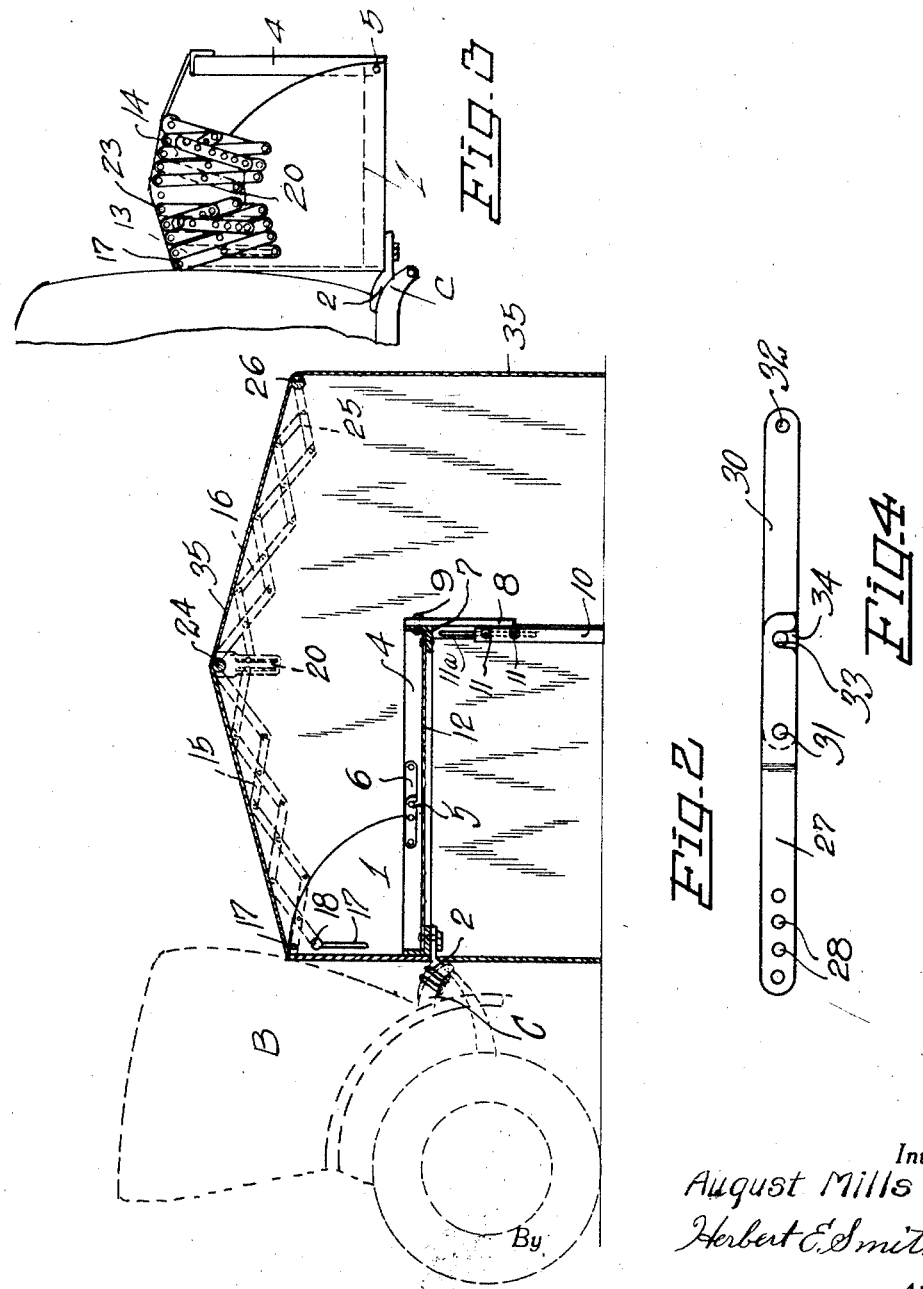

1,712,836

UNITED STATES PATENT OFFICE.

AUGUST MILLS, OF SEATTLE, WASHINGTON.

COMBINATION BED AND TENT.

Application filed November 19, 1927. Serial No. 234,335.

The primary object of my invention is the provision of an appliance of this character which will insure a commodious space within the tent that may be used without the bed as a dressing room, and in which the bed may be made up and occupy a portion of the enclosed space within the tent, and yet leave sufficient space for a dressing room.

Means are provided whereby the framework for the tent may be compactly stowed away at the rear of an automobile, and this frame may with equal facility be extended to supporting position for the canvas tent. Means are also provided whereby the bed may be folded into compact position for storing and the bed may also with convenience be extended and set up for use.

The invention consists in certain novel combinations and arrangements of parts as will hereinafter be more fully set forth and claimed.

In the accompanying drawings, I have illustrated one complete example of the physical embodiment of my invention wherein the parts are combined and arranged according to the best mode I have so far devised for the practical application of the principles of my invention.

Fig. 2 is a sectional view through the tent covering and showing the bed in position for use;

Fig. 3 is a detail end elevation of the appliance in stowed away position at the rear of an automobile; and Fig. 4 is an enlarged detail view showing one of the locking latches for a lazy tong section.

Figure 1:
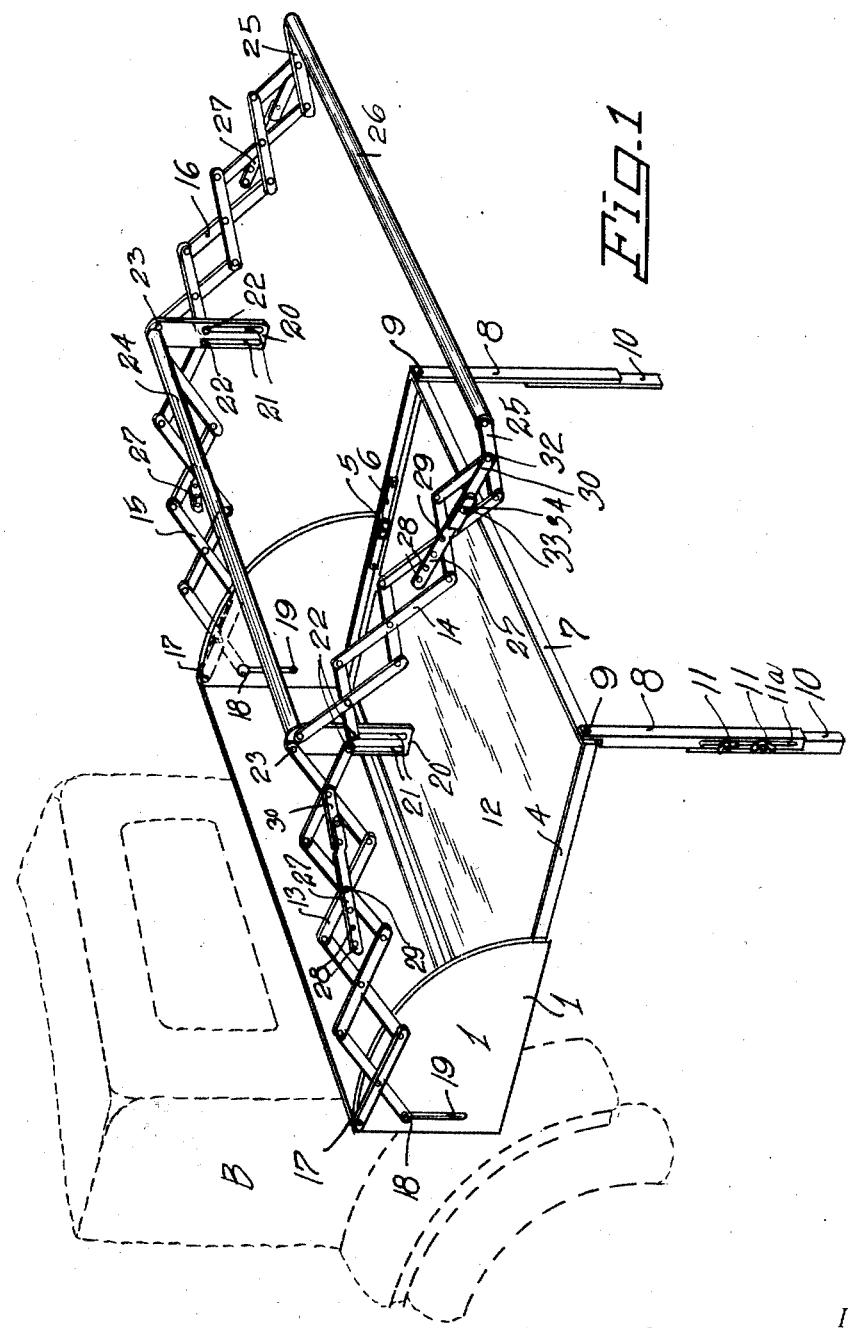
Figure 1 is a perspective view showing the appliance at the rear of an automobile with all parts extended, but with the canvas tent omitted.

In order that the general arrangement and relation of parts may readily be understood, I have indicated by the letter B the body of an automobile, and C indicates the chassis or frame of the automobile. At the rear end of the car or automobile, I attach an open box or receptacle as 1 which is provided with brackets 2 and these brackets are bolted at 3 to the rear end of the chassis or frame. The box or casing 1 is designed to receive the foldable, compacted parts of the combined bed and tent as shown in Fig. 3. These parts may readily be folded and compacted into an enclosure of a small compass which will not present an objectionable appearance at the rear of the automobile.

The bed which is supported upon the box 1 is provided with foldable end bars 4 which are hinged at 5 intermediate their ends, and a locking latch 6 is provided for each one of these folding bars by means of which the bars may be latched in extended position as in Fig. 1. The bed frame has a side bar 7 and two legs or posts 8, the legs being hinged at 9 to the ends of the side bar 7, and these legs are designed to fold up parallel with the side bar 7. In order that the bed may be properly adjusted and levelled upon irregular ground, I provide the legs 8 with telescopic extensions 10 and by means of clamp nuts 11 and slots 11ᵃ in the legs 8, it will be apparent that the extensions 10 may be adjusted vertically to compensate for irregularities on the surface of the ground and the bed 12 may thus be properly levelled.

The parts of the bed may be folded upon themselves and these folded parts then turned back into the receptacle or box and the outer hinged parts of the end bars 4, as shown in Fig. 3, provide corner posts for the paraphernalia when the latter is folded into compact position and not in use.

The tent is supported by two trusses each one made up of a pair of lazy tong sections as 13 and 14, and 15 and 16. These lazy tong sections are all of complementary construction and the reference characters will be used to designate similar parts in the various sections.

The two trusses are provided with a fixed pivot point 17 at the inner ends of the lazy tongs and this pivot point may be a bolt supported in the box or case 1. Below the stationary pivot point 17, the lazy tong sections 13 and 15 are provided with movable pivot points 18 and these pivot points may be bolts that are vertically slidable in the guide slots 19 in the end plates of the box or receptacle 1. The pair of sections 13, 14 make up a truss, and the pair of sections 15, 16 make up another truss, and each of these trusses is provided with an intermediate key plate 20. These plates are arranged in vertical planes and are provided with pairs of parallel, vertical slots 21 in which the movable pivot bolts 22 of the lazy tong sections are designed to travel when the size and shape of the tent are being adjusted. Each lazy tong section also has a stationary pivot as 23 on the key plates, and these stationary pivots are located at the tops of the plates as seen in Fig. 1.

A peak bar for the tent, or horizontal pole 24 connects these two key plates, and at the outer free ends of the two trusses the lazy tongs are provided with lever arms 25 between which an outer bar or pole 26 is pivotally suspended. This pole 26 may be used as a handle for extending or contracting the lazy tongs trusses, and it of course is designed to support the canvas covering or tent 35.

The several sections of the lazy tongs trusses are provided with locking means to limit the movement of these lazy tongs and to lock the lazy tongs in the desired adjusted extended position. Each one of these locking devices includes a lock bar 27 having therein a series of holes 28 for a pivot bolt 29 which pivotally connects or hinges the lock bar to a joint of the lazy tongs. An arm 30 is pivoted at 31 to each of the lock bars and this arm is pivoted at 32 to the lazy tongs. The arm 30 is provided with a latch pin 33 and the free end of the lock bar 27 is provided with a complementary notch 34 to engage the pin as indicated in Fig. 4. Thus it will be apparent that when the frame of the bed has been set up the supporting frame for the canvas tent 35 may be extended by pulling out on the bar 26 to extend the lazy tong sections. After the lazy tong sections have been extended, the four locking devices are pushed to the locked position of Fig. 4 and these locking devices are instrumental in holding the trusses in proper supporting position for the tent or covering 35.

After the tent has been removed and the locked devices have been released, by pushing in on the bar 26 the lazy tong sections may be folded into compact position and then the parts of the bed may be folded and stowed away together with the supporting frame for the canvas tent.

Having thus fully described my invention, what I claim as new and desire to secure by Letters Patent is—

1. The combination with a box like enclosure having slots in its end walls, of a pair of spaced trusses, each truss comprising a pair of lazy tong sections, a section of each truss having a stationary pivot and a movable pivot on the box like structure, a peak pole connecting said trusses, and an end bar connecting the free ends of said trusses.

2. The combination with a support having pairs of stationary hinges and movable hinges, of a pair of spaced trusses each comprising a pair of lazy tong sections and an intermediate key plate to which said sections are pivoted, a peak pole connecting said plates, and an end bar connecting the free ends of said trusses.

3. The combination with a box like structure having vertical slots therein, of a pair of trusses each comprising a pair of lazy tong sections, said trusses each having a stationary pivot and a movable pivot supported on the structure, a key plate intermediate of the sections of each truss, a peak pole connecting said key plates, an end bar connecting the free ends of the trusses, and pivotal sectional hinged lock bars for the sections designed to lock them in extended position.

In testimony whereof I affix my signature.

AUGUST MILLS.